US011593709B2

(12) United States Patent
Singh et al.

(10) Patent No.: US 11,593,709 B2
(45) Date of Patent: Feb. 28, 2023

(54) INSERTING AND/OR REPLACING MACHINE LEARNING MODELS IN A PIPELINE FOR ROBOTIC PROCESS AUTOMATION WORKFLOWS

(71) Applicant: UiPath, Inc., New York, NY (US)

(72) Inventors: Prabhdeep Singh, Bellevue, WA (US); Tony Tzeng, Bellevue, WA (US); Alexandru Cabuz, Bucharest (RO)

(73) Assignee: UiPath, Inc., New York, NY (US)

( * ) Notice: Subject to any disclaimer, the term of this patent is extended or adjusted under 35 U.S.C. 154(b) by 516 days.

(21) Appl. No.: 16/707,977

(22) Filed: Dec. 9, 2019

(65) Prior Publication Data

US 2021/0110301 A1   Apr. 15, 2021

Related U.S. Application Data

(60) Provisional application No. 62/915,413, filed on Oct. 15, 2019.

(51) Int. Cl.
*G06N 20/00* (2019.01)
*G06Q 10/0633* (2023.01)
*G06F 8/60* (2018.01)

(52) U.S. Cl.
CPC ............ *G06N 20/00* (2019.01); *G06F 8/60* (2013.01); *G06Q 10/0633* (2013.01)

(58) Field of Classification Search
CPC ...... G06N 20/00; G06Q 10/067; G06Q 10/06; G06Q 10/04; G06Q 10/103; G06Q 10/0633
See application file for complete search history.

(56) References Cited

U.S. PATENT DOCUMENTS

| | | | |
|---|---|---|---|
| 7,363,594 B1* | 4/2008 | Wright | G06Q 10/0633 |
| | | | 715/969 |
| 7,849,052 B2 | 12/2010 | Vicars et al. | |
| 9,772,934 B2* | 9/2017 | Maag | G06F 11/3692 |
| 9,798,523 B2* | 10/2017 | Chau | G06F 8/20 |
| 9,946,517 B2* | 4/2018 | Talby | G06F 8/355 |
| 10,270,644 B1* | 4/2019 | Valsecchi | H04L 41/0645 |
| 10,417,577 B2* | 9/2019 | Bowers | G06F 9/453 |
| 10,565,093 B1* | 2/2020 | Herrin | G06F 8/77 |
| 10,643,144 B2* | 5/2020 | Bowers | G06N 20/00 |
| 10,710,239 B2* | 7/2020 | Safary | G06F 11/00 |
| 10,963,231 B1* | 3/2021 | Singh | G06F 8/60 |
| 11,042,458 B2* | 6/2021 | Goyal | G06F 11/0715 |

(Continued)

OTHER PUBLICATIONS

PCTUS2020046777, UIPath Inc., ISA237 Written Opinion of the International Search Authority dated Dec. 3, 2020 (Year: 2020).*

(Continued)

*Primary Examiner* — Scott L Jarrett
(74) *Attorney, Agent, or Firm* — LeonardPatel PC; Michael A. Leonard, II; Sheetal S. Patel

(57) ABSTRACT

A reconfigurable workbench pipeline for robotic process automation (RPA) workflows is disclosed. Different workbench pipelines may be built for different users. For instance, a global workflow (e.g., a receipt extractor) may be built and used initially, but this workflow may not work optimally or at all for a certain user or a certain task. A machine learning (ML) model may be employed, potentially with a human-in-the-loop, to specialize the global workflow for a given task.

15 Claims, 7 Drawing Sheets

(56) References Cited

U.S. PATENT DOCUMENTS

| | | | |
|---|---|---|---|
| 11,074,105 B2* | 7/2021 | Walby | G06F 9/5072 |
| 11,157,855 B2* | 10/2021 | Parimelazhagan | G06F 16/951 |
| 11,200,539 B2* | 12/2021 | Iyer | G06Q 10/0633 |
| 11,269,911 B1* | 3/2022 | Jones | G06F 9/543 |
| 11,279,040 B2* | 3/2022 | An | G06F 11/0736 |
| 11,334,471 B1* | 5/2022 | Stocker | G06F 11/3684 |
| 11,429,351 B2* | 8/2022 | Nayak | G06N 20/00 |
| 2006/0195817 A1* | 8/2006 | Moon | G06F 11/368 717/104 |
| 2007/0143736 A1* | 6/2007 | Moriarty | G06Q 10/06 715/201 |
| 2007/0250335 A1* | 10/2007 | Hodges | G06Q 10/0633 |
| 2014/0025426 A1 | 1/2014 | Doehring et al. | |
| 2016/0019091 A1* | 1/2016 | Leber | G06F 11/0793 718/106 |
| 2016/0162801 A1 | 6/2016 | Ardila et al. | |
| 2016/0203036 A1* | 7/2016 | Mezic | G06N 7/005 714/819 |
| 2016/0358102 A1* | 12/2016 | Bowers | G06N 20/00 |
| 2016/0358103 A1* | 12/2016 | Bowers | G06F 9/4881 |
| 2016/0364211 A1* | 12/2016 | Chau | G06F 8/20 |
| 2016/0364647 A1 | 12/2016 | Achin et al. | |
| 2017/0076246 A1* | 3/2017 | Volkov | G06Q 10/0633 |
| 2017/0161855 A1 | 6/2017 | Schreyer | |
| 2017/0270431 A1* | 9/2017 | Hosabettu | G06F 9/4881 |
| 2018/0124077 A1 | 5/2018 | Carver et al. | |
| 2018/0189679 A1* | 7/2018 | Kang | G06N 5/022 |
| 2018/0197123 A1* | 7/2018 | Parimelazhagan | G06Q 10/0633 |
| 2019/0108417 A1* | 4/2019 | Talagala | G06N 5/04 |
| 2019/0258976 A1 | 8/2019 | Parees et al. | |
| 2019/0324893 A1* | 10/2019 | Vaishnav | G06F 11/3664 |
| 2020/0057675 A1* | 2/2020 | Dias | G06F 9/5083 |
| 2020/0097389 A1* | 3/2020 | Smith | G06F 11/3612 |
| 2020/0234177 A1* | 7/2020 | Matcha | G06K 9/6267 |
| 2020/0242516 A1* | 7/2020 | Dhingra | G06N 5/04 |
| 2020/0401491 A1* | 12/2020 | Mohamed | G06N 20/00 |
| 2021/0065048 A1* | 3/2021 | Salonidis | G06F 9/542 |
| 2021/0073026 A1* | 3/2021 | Myers | G06F 11/3065 |
| 2021/0081848 A1* | 3/2021 | Polleri | G06N 20/20 |
| 2021/0089937 A1* | 3/2021 | Zhang | G06N 5/04 |
| 2021/0107141 A1* | 4/2021 | Shrivastava | G06N 20/00 |
| 2021/0110301 A1* | 4/2021 | Singh | G06Q 30/04 |

OTHER PUBLICATIONS

PCTUS2020046777, UIPath Inc., ISA210 International Search Report dated Dec. 3, 2020 (Year: 2020).*

PCTUS2020046777, UIPath Inc., ISA210 International Preliminary Report on Patentability—Chapter 1 dated Apr. 19, 2022 (Year: 2020).*

Lu, Shiyong et al., Automatic workflow verification and generation Theoretical Computer Science, vol. 353, 2006 (Year: 2006).*

McClure, Sean, GUI-fying the Machine Learning Workflow: Towards Rapid Discovery of Viable Pipelines Towards Data Science, Jun. 25, 2018 (Year: 2018).*

Cody, Christa, Visual machine learning using SAS Viya: a Graduate's Intern's perspective SAS Blog, Jul. 12, 2019 (Year: 2019).*

Exploring SAS Viya: Data Mining and Machine Learning SAS Institute Inc., 2019 (Year: 2019).*

Barnes, Jeff, Azure Machine Learning: Microsoft Azure Essentials Microsoft Corporation, 2015 (Year: 2015).*

International Search Report and Written Opinion of the International Search Authority (KIPO) received for PCT Application No. PCT/US2020/046777 dated Dec. 3, 2020.

DataRobot, "What a Machine Learning Pipeline is and Why It's Important," https://www.datarobot.com/blog/what-a-machine-learning-pipeline-is-and-why-its-important/ (Sep. 10, 2020).

Sean Morgan et al, "Building, automating, managing, and scaling ML workflows using Amazon SageMaker Pipelines," https://aws.amazon.com/blogs/machine-learning/building-automating-managing-and-scaling-ml-workflows-using-amazon-sagemaker-pipelines/ (Jan. 19, 2021).

* cited by examiner

INSERTING AND/OR REPLACING MACHINE LEARNING MODELS IN A PIPELINE FOR ROBOTIC PROCESS AUTOMATION WORKFLOWS

CROSS-REFERENCE TO RELATED APPLICATION

This application claims the benefit of U.S. Provisional Patent Application No. 62/915,413 filed Oct. 15, 2019. The subject matter of this earlier filed application is hereby incorporated by reference in its entirety.

FIELD

The present invention generally relates to robotic process automation (RPA), and more specifically, to a reconfigurable workbench pipeline for RPA workflows.

BACKGROUND

Current RPA workflows are deterministic in nature and include a static pipeline of activities. In other words, a single logical flow is created and applied by the robot(s) in executing the workflow. The "pipeline" refers to a series of steps that extract data and/or certain actions that are taken based on the extracted data. However, such a static pipeline may not be optimal for all situations, and particularly those that change over time or are targeted for a specific user. Accordingly, an improved solution may be beneficial.

SUMMARY

Certain embodiments of the present invention may provide solutions to the problems and needs in the art that have not yet been fully identified, appreciated, or solved by current RPA technologies. For example, some embodiments of the present invention pertain to a reconfigurable workbench pipeline for RPA workflows.

In an embodiment, a computer-implemented method for providing a reconfigurable workbench pipeline for RPA workflows using ML includes executing a global workflow, by an RPA robot. The computer-implemented method also includes determining that a pipeline of the global workflow is not working correctly for a scenario and employing AI-driven testing to identify one or more ML models or other components to be applied to the pipeline and/or modified in the pipeline of the global workflow to repair the global workflow or specialize the global workflow for the scenario. The computer-implemented method further includes implementing the identified ML models and/or other components in a pipeline of a local workflow.

In another embodiment, a computer-implemented method for providing a reconfigurable workbench pipeline for RPA workflows using ML includes determining that a pipeline of a global workflow is not working correctly for a scenario and employing AI-driven testing to identify one or more ML models or other components to be applied to the pipeline and/or modified in the pipeline of the global workflow to repair the global workflow or specialize the global workflow for the scenario. The computer-implemented method also includes implementing the identified ML models and/or other components in a pipeline of a local workflow.

In yet another embodiment, a computer-implemented method for providing a reconfigurable workbench pipeline for RPA workflows using ML includes employing AI-driven testing to identify one or more ML models or other components to be applied to a pipeline and/or modified in the pipeline of a global workflow to repair the global workflow or specialize the global workflow for a scenario and implementing the identified ML models and/or other components in a pipeline of a local workflow. The AI-driven testing includes checking an output of a first component of the pipeline and when the output of the first component is incorrect, reconfiguring or replacing the first component. The AI-driven testing also includes checking outputs of each subsequent component in the pipeline and reconfiguring or replacing each incorrectly operating component until an output of the pipeline is correct or outputs of all components have been checked.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
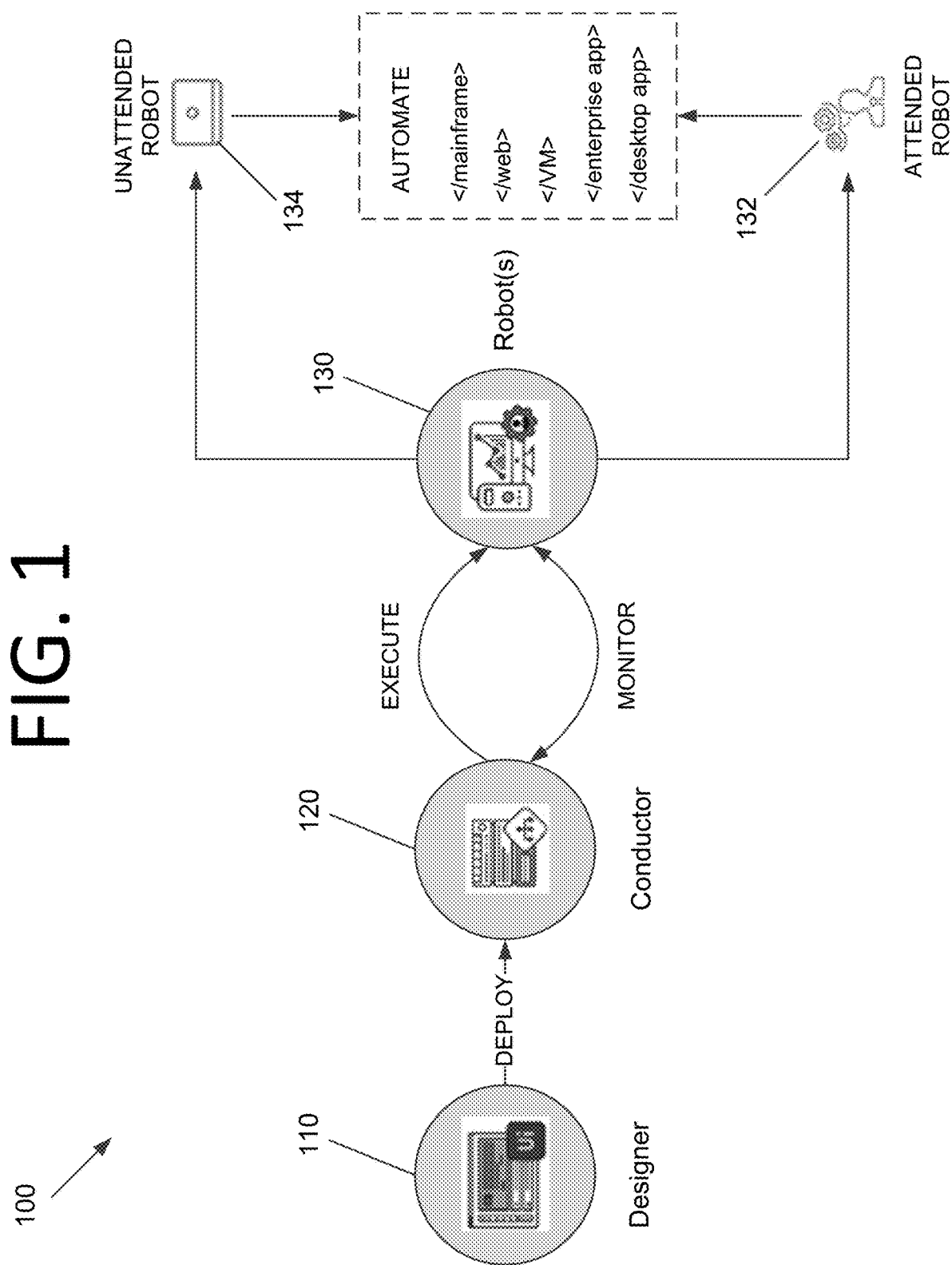
FIG. 1 is an architectural diagram illustrating an RPA system, according to an embodiment of the present invention.

Some embodiments pertain to a reconfigurable workbench pipeline for RPA workflows. In some embodiments, the reconfigurable workbench pipeline may apply machine learning (ML) models that attempt to fix or improve operation of the pipeline. In certain embodiments, this may be a rule-based operation rather than an ML model. In some embodiments, the system may have controls that could suggest models and/or transformational components to satisfy a given use case.

For example, consider the case where emails are received that may have various attachments (e.g., invoices, purchase orders, etc.). It may be desirable to have a component in the pipeline that operates as a gating function to identify and flag invoices in emails before sending the flagged invoices to an ML model for invoice processing. However, the pipeline may not operate correctly in all cases. When running an invoice through the pipeline, the system may thus watch for whether there is an output at the end of the pipeline. When there is no output, the system may make modifications to the pipeline by applying a series of transformations to different pipeline stages. For instance, the system could start with the first stage and check each subsequent stage thereafter to look for the source of the failure. The system may check component 1 of the pipeline, then component 2, then component 3, etc. If the pipeline is failing to identify documents properly in emails, the system can try to apply different instances and/or configurations of the pipeline components to attempt to find a solution. If a solution cannot be found, the system may notify an RPA developer.

The reconfigurable pipelines of some embodiments may be applied to document processing, other data transformation pipelines, data extraction pipelines, etc. The reconfigurable pipelines may involve components for human input and/or specialized models for classification, extraction, etc. For instance, a global workflow (e.g., a receipt extractor) may be built and used initially, but this workflow may not work optimally or at all for a certain user or a certain task. ML models may be employed, potentially with a human-in-the-loop, to specialize the global workflow for a given task. In some embodiments, human input may be tracked and used to retrain the ML models such that they become more intelligent as more and more human input is gathered and used for retraining.

In the context of document processing and other complex artificial intelligence (AI) applications, users tend to have different data, use cases, systems that they interact with, and outcomes. For instance, while both Walmart® and a small "mom and pop" retailer may benefit from an invoice processing solution, their requirements differ significantly. The invoice processing solution for the small retailer may involve retrieving invoices from incoming emails, performing text recognition on the invoices using optical character recognition (OCR) and/or image recognition (such as using the computer vision (CV) technology described in more detail below), retrieving invoice information from the data recognized by the OCR/CV, and entering the retrieved invoice information into QuickBooks®.

However, the invoice processing solution for Walmart® may be substantially more complex. Such a large retailer deals with massive numbers of invoices of different types that should go to different systems, and there would be additional items other than receipts. For instance, multiple document types may be included, and the correct documents may need to be picked up using a classifier. A large retailer may thus desire that the classifier identify the types of invoices in this data and pass the invoices to the correct downstream workflow based on their type. Such a large retailer will likely also have incoming invoices written in different languages, so a language processor may be beneficial to convert these invoices into English, for example.

The workbench pipeline of some embodiments allows "blocks" of models or other logic to be applied to workflows in order to custom tailor the workflows to local applications from global requirements. These blocks and/or logic are the stages (or components) of the pipeline. To begin, in some embodiments, RPA developers create an initial workflow as a "global" workflow for a certain application with intelligence built in (e.g., via calls to ML models). The ML models may monitor behavior of an executing robot and automatically determine that certain activities should be included in the workflow, replaced with other activities, or be modified. For example, if a monitoring ML model determines that a user is frequently going into QuickBooks® and correcting a certain field after a robot processes invoices, the ML model may retrieve a different text recognition model or a CV model (e.g., the text is stylized and located within a company logo with the stylized word and an image) and modify the text recognition activity to use this model instead.

In some embodiments, base ML models may be used for the global workflow, and custom models may be added later. In this sense, the workflow may have plug-and-play functionality that allows blocks to be added, removed, and/or changed after initial implementation. For example, a global model may be a receipt data extraction model, but a Spanish language translator model could be added as a local model to parse receipts in Spanish.

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
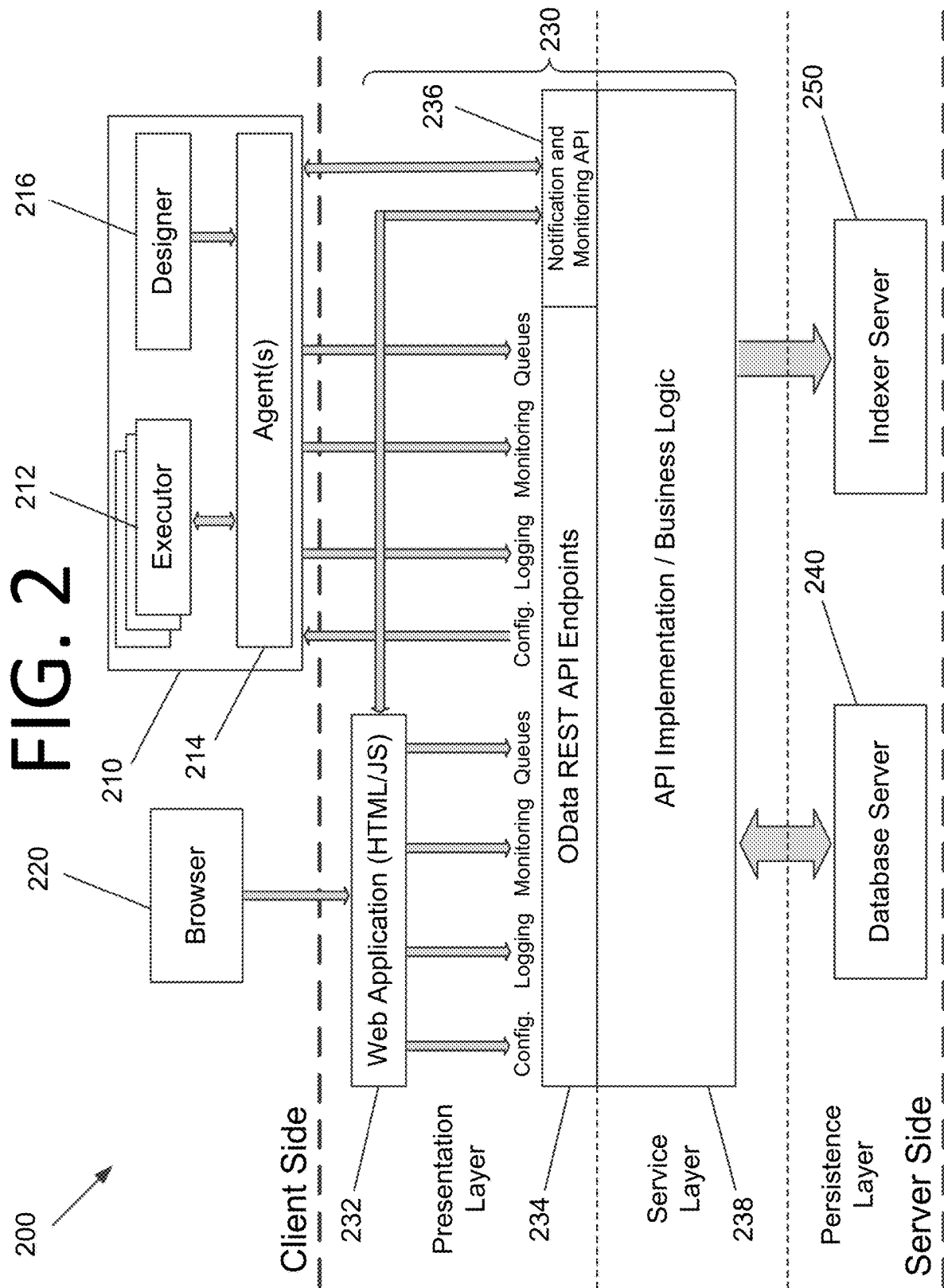
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 220 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
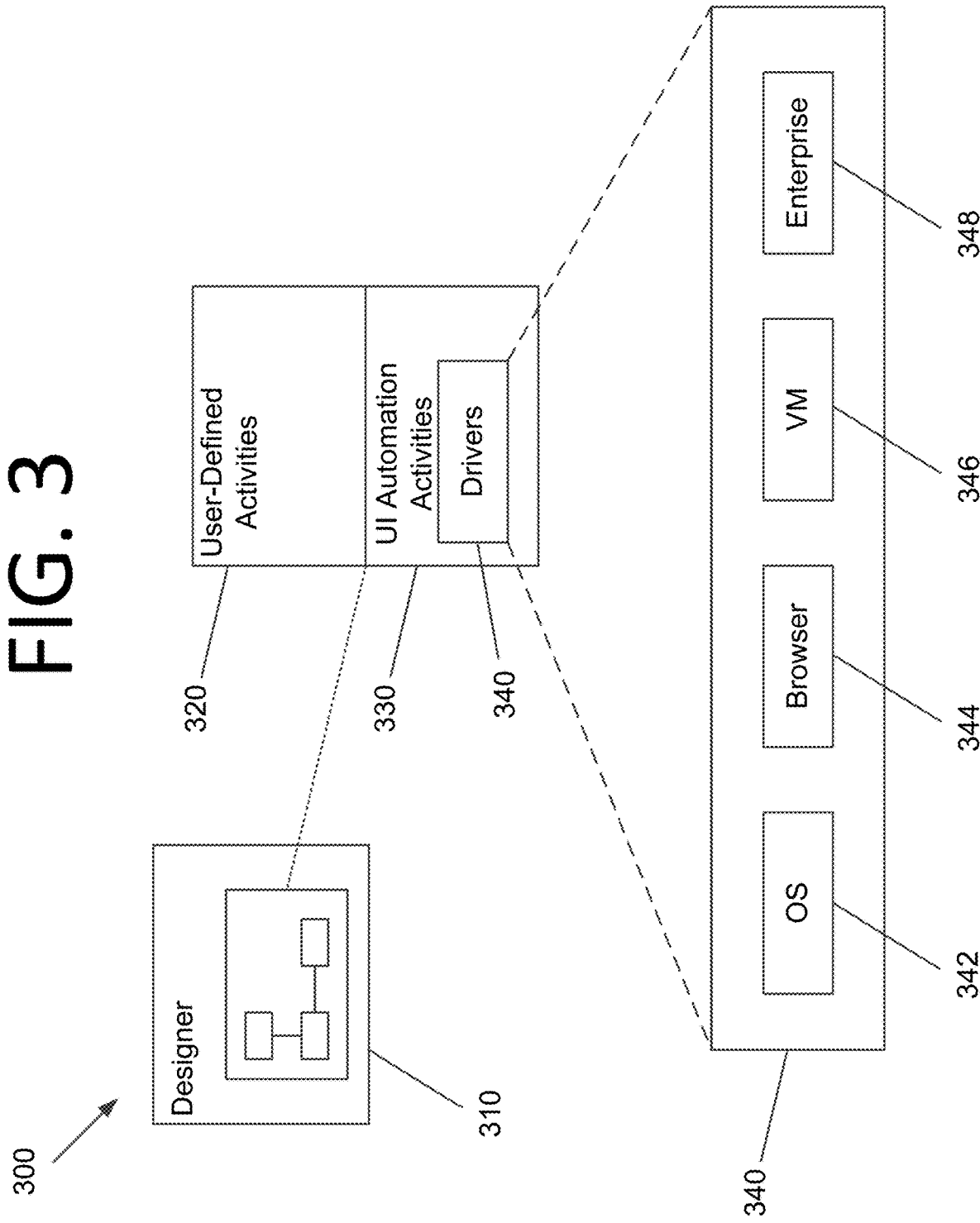
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
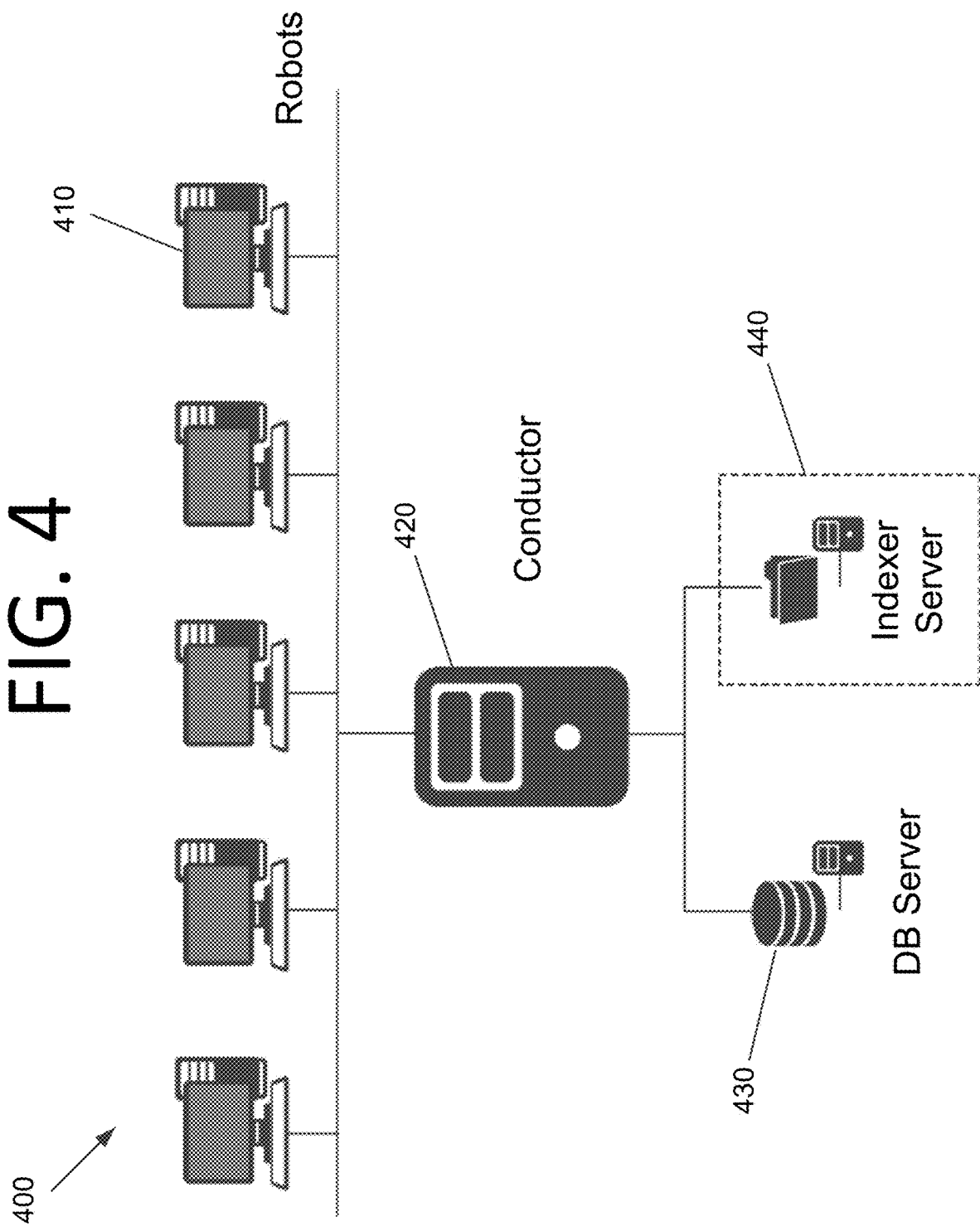
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
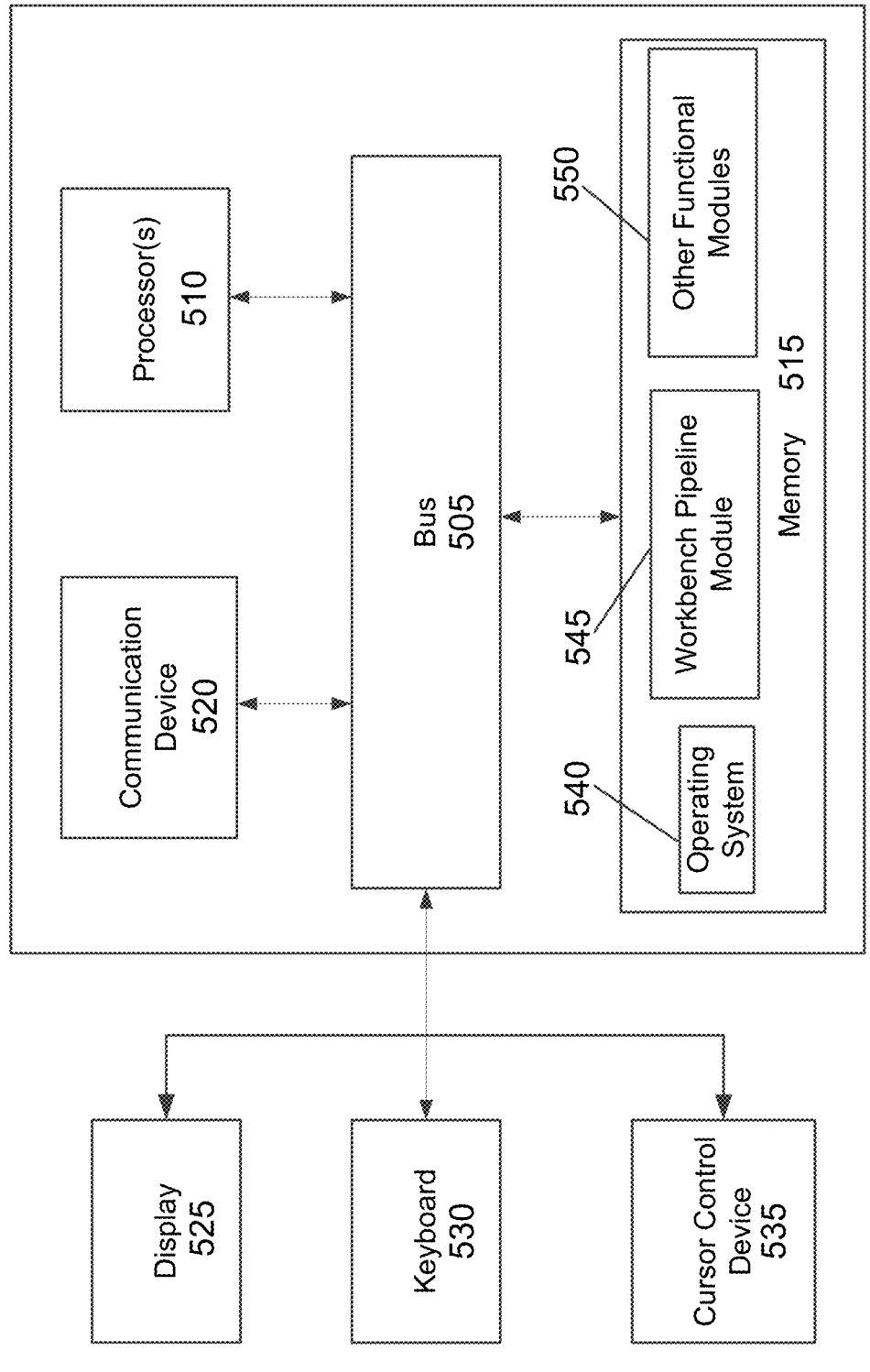
FIG. 5 is an architectural diagram illustrating a computing system configured to implement a reconfigurable workbench pipeline for RPA workflows, according to an embodiment of the present invention.

FIG. 5 is an architectural diagram illustrating a computing system 500 configured to implement a reconfigurable workbench pipeline for RPA workflows, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include workbench pipeline module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
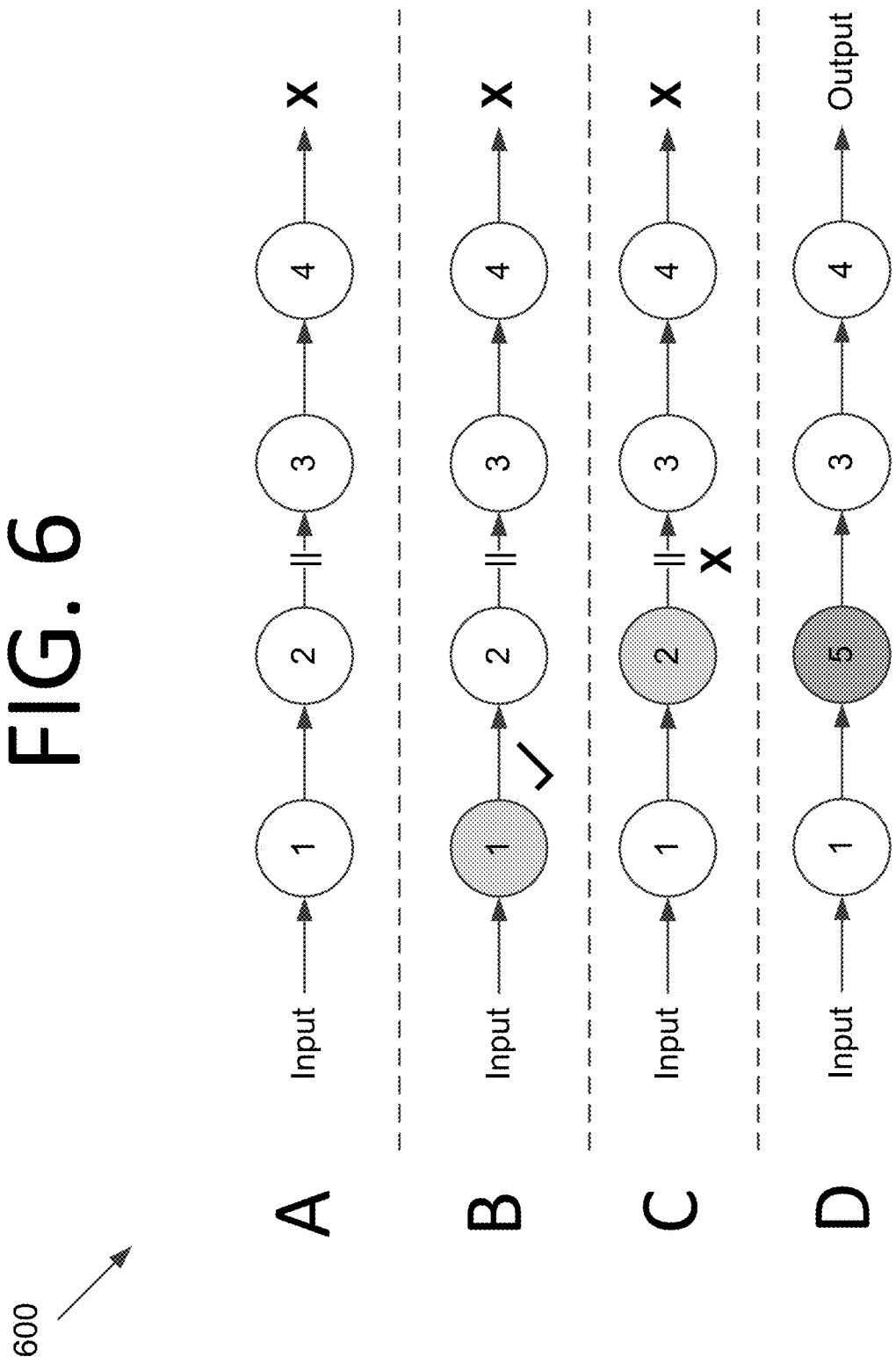
FIG. 6 illustrates a reconfigurable workbench pipeline that is not producing output (or not producing the correct output) and operations to correct its performance, according to an embodiment of the present invention.

FIG. 6 illustrates a reconfigurable workbench pipeline 600 that is not producing output (or not producing the correct output) and operations to correct its performance, according to an embodiment of the present invention. In initial state A, four components 1, 2, 3, and 4 are chained to produce an output. However, no output or the wrong output is being produced due to the output from component 2, as denoted by the "X" on the right. The workbench pipeline first checks the input and output of component 1 in state B. These are determined to be correct, so the workbench pipeline proceeds to check the output of component 2 in state C. The output of component 2 is determined to have an error for this use case.

The system then attempts to find a solution to the problem by testing new components (e.g., ML models, conditional logic, etc.). In this example, the system determines that inserting component 5 provides the correct output for the pipeline, and replaces component 2 with component 5 at step D. This modifies the pipeline to produce the correct output, thus "repairing" the pipeline and making the pipeline reconfigurable.

Figure 7:
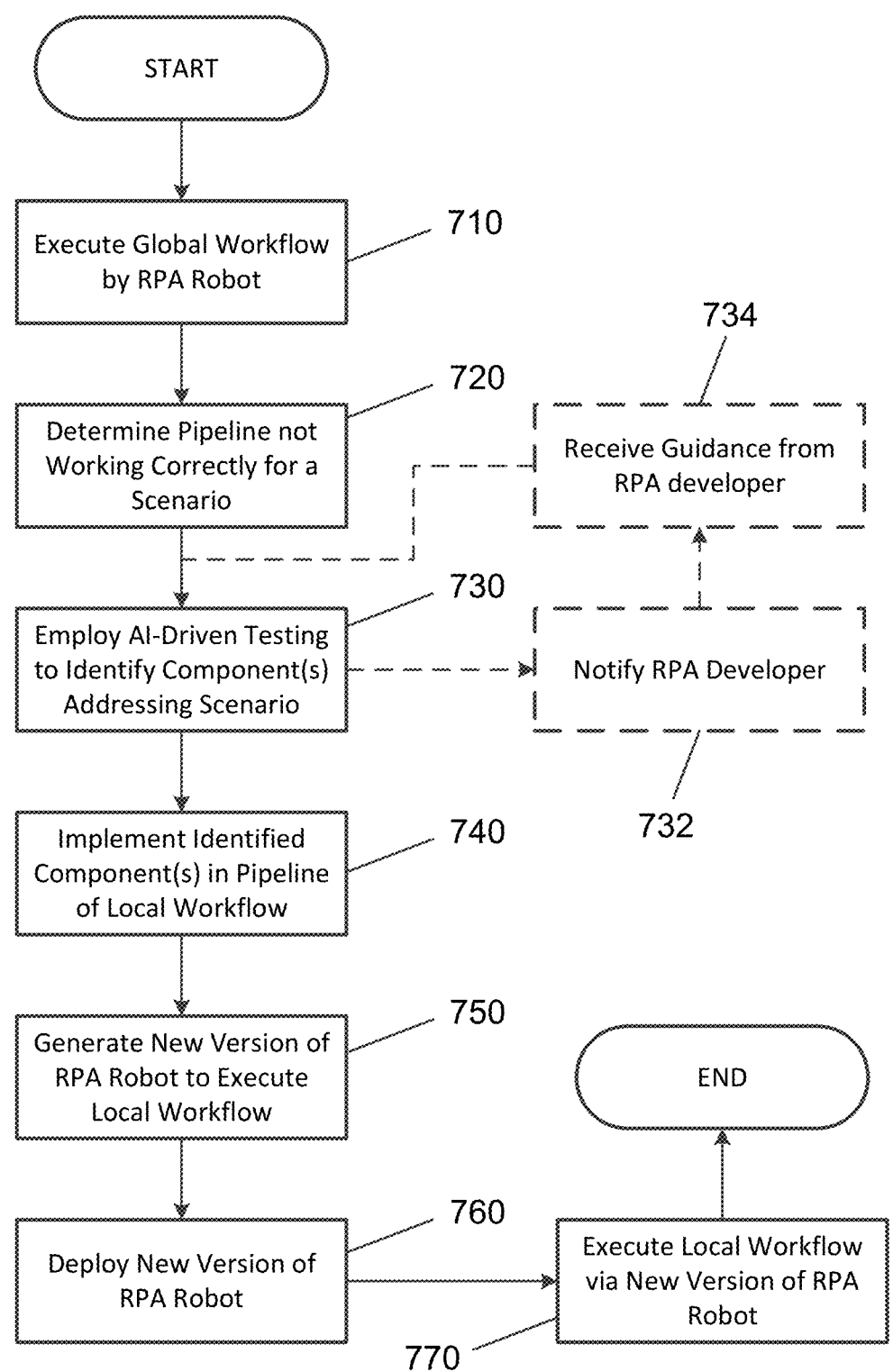
FIG. 7 is a flowchart illustrating a process for implementing a reconfigurable workbench pipeline for RPA workflows using ML, according to an embodiment of the present invention.

FIG. 7 is a flowchart illustrating a process 700 for implementing a reconfigurable workbench pipeline for RPA workflows using ML, according to an embodiment of the present invention. The process beings with executing a global workflow, by an RPA robot, at 710. It is then determined that a pipeline of the global workflow is not working correctly for a scenario at 720 (e.g., by the RPA robot, another software application, a computing system, etc.). The AI-driven testing is employed to identify one or more ML models or other components to be applied to a pipeline and/or modified in the pipeline of the global workflow to repair the global workflow or specialize the global workflow for the scenario at 730.

In some embodiments, the identification of the models or other components to be applied to the pipeline may be similar to the process described above with respect to FIG. 6. For instance, when the pipeline is not producing output or not producing the correct output, the input and output of the first component may be checked. If one or both of the input and output are incorrect, corrective action may be taken (e.g., by analyzing the data source in the case of an input error or reconfiguring or replacing the first component if there is an output error). Analyzing the data source may include checking logic in software, a system a robot, etc. that is producing the input. For instance, one or more SQL commands in database operations may be incorrect. Reconfiguring the first component may include modifying parameters for the component, changing its logic, causing the component to call a different ML model, any combination thereof, etc. If the input and output of the first component are correct, the output of the second component may be checked, then the third component, and so on until all components that are not working properly in the pipeline have been identified and addressed.

In some embodiments, when one or more ML models and/or other components cannot be determined for the pipeline at 730, the system notifies an RPA developer at 732 that the pipeline is not functioning correctly (e.g., sending a communication that includes the workflow, the pipeline component(s) that are not functioning properly, log data indicating which replacement component(s) and/or modifications to existing components were attempted, or any combination thereof) and receives guidance from the RPA developer at 734. In some embodiments, the guidance from the RPA developer may include a repaired version of the pipeline, a local workflow, new pipeline components, any combination thereof, etc. The system then implements the identified ML models and/or other components in a pipeline of a local workflow at 740. A new version of the RPA robot is then generated to execute the local workflow at 750. The new version of the RPA robot is deployed at 760 and the local workflow is executed by the new version of the RPA robot at 770.

The process steps performed in FIG. 7 may be performed by a computer program, encoding instructions for the processor(s) to perform at least part of the process(es) described in FIG. 7, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 7, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method executed by a computing system for providing a reconfigurable workbench pipeline for robotic process automation (RPA) workflows using machine learning (ML), comprising:
    executing a global workflow, by an RPA robot executing on the computing system, wherein the global workflow is an initial workflow for a task and the global workflow comprises a pipeline comprising a plurality of ML models;
    determining that the pipeline of the global workflow is not working for a scenario, by the RPA robot, another RPA robot, or another software application of the computing system, by sequentially checking an input and an output of the plurality of ML models of the pipeline of the global workflow;
    inserting at least one new ML model into the pipeline, replacing at least one ML model in the pipeline, or both, by the computing system;
    generating a local pipeline of a local workflow of the computing system, by the computing system; and
    executing the local workflow, by the RPA robot, wherein
    the generated local pipeline comprises the at least one inserted new ML model, the at least one replaced ML model, or both,
    the local workflow comprises a user interface (UI) automation activity, and
    the UI automation activity interacts with the UI of a display of the computing system using one or more drivers to perform part of the task.

2. The computer-implemented method of claim 1, further comprising:
    notifying an RPA developer that the pipeline is not functioning correctly; and
    receiving guidance from the RPA developer regarding how to correct the pipeline.

3. The computer-implemented method of claim 2, wherein the notification comprises sending a communication to the RPA developer that comprises the local workflow, one or more pipeline ML models that are not functioning properly, log data indicating which replacement ML models and/or modifications to existing ML models were attempted, or any combination thereof.

4. The computer-implemented method of claim 2, wherein the guidance from the RPA developer comprises a repaired version of the pipeline, the local workflow, one or more new pipeline ML models, or any combination thereof.

5. The computer-implemented method of claim 1, further comprising:
    analyzing an input of a first ML model of the pipeline; and
    when the input of the first ML model is incorrect, analyzing a data source of the input of the first ML model.

6. The computer-implemented method of claim 1, wherein the one or more drivers comprise an operating system (OS) driver, a browser driver, a virtual machine (VM) driver, an enterprise application driver, or any combination thereof.

7. A computer-implemented method executed by a computing system for providing a reconfigurable workbench pipeline for robotic process automation (RPA) workflows using machine learning (ML), comprising:
    determining that a pipeline of a global workflow is not working for a scenario, by an RPA robot, another RPA robot, or another software application of the computing system, by sequentially checking an input and an output of a plurality of ML models of the pipeline of the global workflow;
    inserting at least one new ML model into the pipeline, replacing at least one ML model in the pipeline, or both, by the computing system;
    generating a local pipeline of a local workflow of the computing system, by the computing system; and
    executing the local workflow, by the RPA robot, wherein
    the generated local pipeline comprises the at least one inserted new ML model, the at least one replaced ML model, or both,
    the local workflow comprises a user interface (UI) automation activity, and
    the UI automation activity interacts with the UI of a display of the computing system using one or more drivers to perform part of the task.

8. The computer-implemented method of claim 7, further comprising:
    notifying an RPA developer that the pipeline is not functioning correctly, wherein
    the notification comprises sending a communication to the RPA developer that comprises the local workflow, one or more pipeline ML models that are not functioning properly, log data indicating which replacement ML models and/or modifications to existing ML models were attempted, or any combination thereof.

9. The computer-implemented method of claim 8, further comprising:
    receiving guidance from the RPA developer regarding how to correct the pipeline, wherein
    the guidance from the RPA developer comprises a repaired version of the pipeline, the local workflow, one or more new pipeline ML models, or any combination thereof.

10. The computer-implemented method of claim 8, further comprising:
analyzing an input of a first ML model of the pipeline; and
when the input of the first ML model is incorrect, analyzing a data source of the input of the first ML model.

11. The computer-implemented method of claim 7, wherein the one or more drivers comprise an operating system (OS) driver, a browser driver, a virtual machine (VM) driver, an enterprise application driver, or any combination thereof.

12. A computer-implemented method executed by a computing system for providing a reconfigurable workbench pipeline for robotic process automation (RPA) workflows using machine learning (ML), comprising:
inserting at least one new ML model into the pipeline, replacing at least one ML model in the pipeline, or both, by the computing system;
generating a local pipeline of a local workflow of the computing system, by the computing system; and
executing the local workflow, by an RPA robot, wherein the generated local pipeline comprises the at least one inserted new ML model, the at least one replaced ML model, or both,
the local workflow comprises a user interface (UI) automation activity, and
the UI automation activity interacts with the UI of a display of the computing system using one or more drivers to perform part of the task.

13. The computer-implemented method of claim 12, further comprising:
determining that the pipeline of the global workflow is not working correctly for the scenario.

14. The computer-implemented method of claim 12, further comprising:
notifying an RPA developer that the pipeline is not functioning correctly, wherein
the notification comprises sending a communication to the RPA developer that comprises the local workflow, one or more pipeline ML models that are not functioning properly, log data indicating which replacement ML models and/or modifications to existing ML models were attempted, or any combination thereof.

15. The computer-implemented method of claim 12, wherein the one or more drivers comprise an operating system (OS) driver, a browser driver, a virtual machine (VM) driver, an enterprise application driver, or any combination thereof.

* * * * *